UNITED STATES PATENT OFFICE.

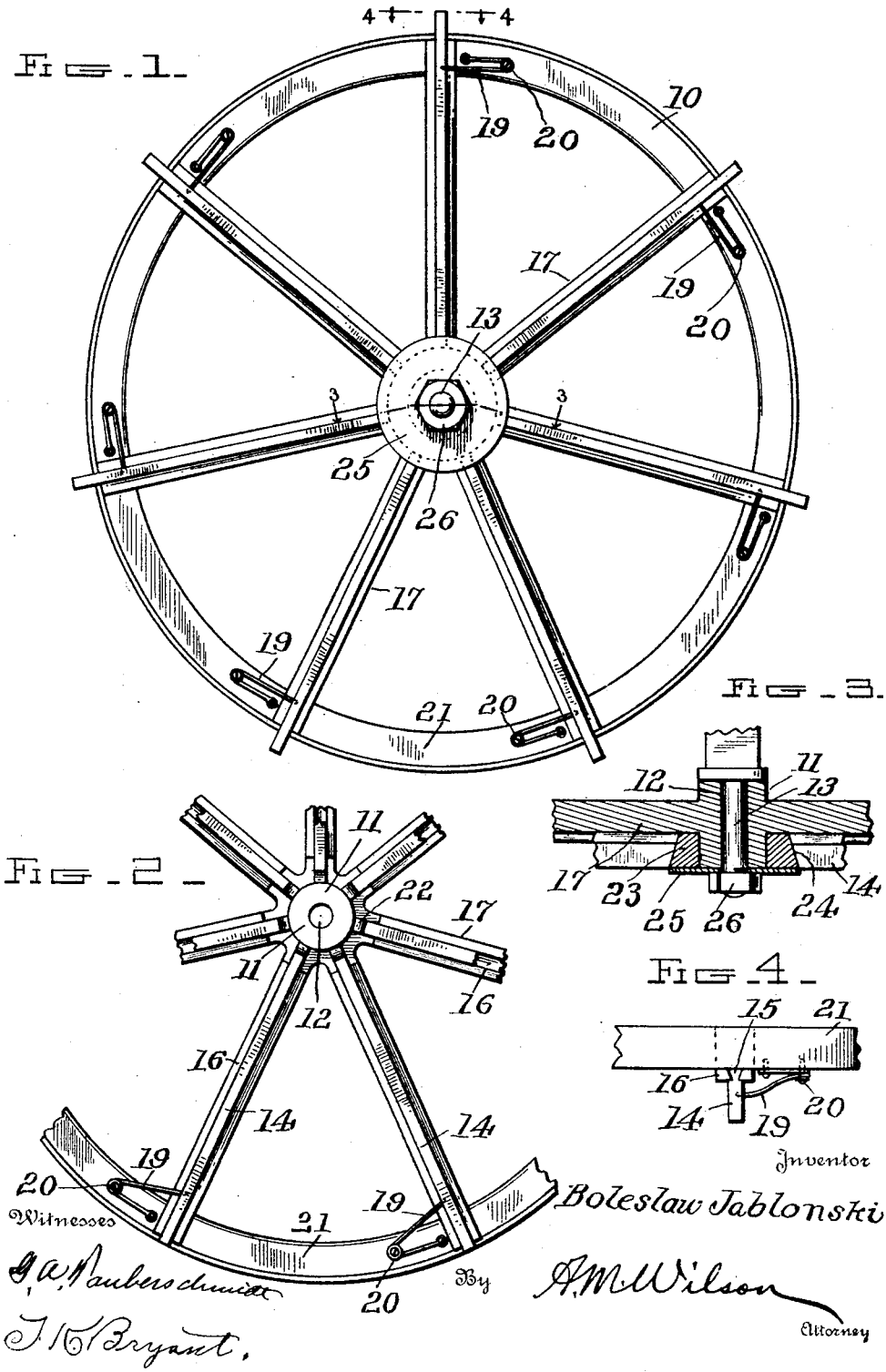

BOLESLAW JABLONSKI, OF NATRONA, PENNSYLVANIA, ASSIGNOR OF ONE-HALF TO WLADYSLAW ROSTOWSKI, OF NATRONA, PENNSYLVANIA.

NON-SKIDDING ATTACHMENT FOR WHEELS.

1,107,953.           Specification of Letters Patent.     Patented Aug. 18, 1914.

Application filed March 17, 1914. Serial No. 825,297.

*To all whom it may concern:*

Be it known that I, BOLESLAW JABLONSKI, a subject of the Emperor of Russia, residing at Natrona, in the county of Allegheny and State of Pennsylvania, have invented certain new and useful Improvements in Non-Skidding Attachments for Wheels, of which the following is a specification.

This invention relates to certain new and useful improvements in non-skidding attachments for wheels.

The primary object of the invention is to provide a vehicle wheel, for either a wagon or an automobile, with a permanent set of positionable calk members adapted to be withdrawn or projected as desired by the operator.

A further object is to provide normally retracted calks upon a vehicle wheel and manually projectable adjacent the tread portion of the wheel when desired for use.

A still further object is to permanently provide a wheel with resiliently retracted slidable calks manually projectable for contacting the traction surface by a mechanical means operable by the driver of the vehicle.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views:—Figure 1 is a side elevation of a vehicle wheel illustrating my invention thereon with the calks projected. Fig. 2 is a similar view of a portion of such a wheel and showing the calks normally retracted. Fig. 3 is a detail sectional view taken upon line 3—3 of Fig. 1, and, Fig. 4 is a detail top plan view as viewed from the line 4—4 of Fig. 1.

Referring more in detail to the drawings, a vehicle wheel 10 is illustrated provided with a hub 11 having a central axial bore 12 therethrough after the usual manner, for receiving the axle 13, it being of course understood that the form of wheel shown is only for purposes of illustration, and that the present invention is equally adaptable for automobile wheels having either pneumatic or cushion tires as well as for all other forms of wheels including traction engine wheels.

Slidable calks 14 are provided in the form of bars having a dove-tail tongue 15 upon one edge adapted to slidably position the calks in the ways 16 lying longitudinally upon similar faces of each of the wheel spokes 17. Said calks 14 are provided with notches 18 for receiving the free ends of the springs 19 secured as at 20 upon the wheel rim 21 and whereby the calks are normally positioned inwardly or retracted as shown in Fig. 2 with their inclined inner ends 22 abutting the wheel hub 11. With the calks retracted as illustrated, it will be evident the forcing of a tapered wedge collar 23 upon the hub 11 and with the tapered outer surface 24 of such collar engaging the inclined ends 22 of the calks, a forcing of the collar seated again the base of the spokes will result in projecting each calk to its position illustrated in Fig. 1 and whereupon a washer 25 or other locking device is seated against such collar by means of the nut 26 screwed upon the outer free end of the axle 13 and thus the calks retained in their projected position for active use as road-bed engaging means for the prevention of skidding and slipping of the wheel.

It is evident that instead of the manual forcing of the collar 23 against the inner ends of the calks and thereby projecting the same for use, that a lever operable from the vehicle may readily be employed for shifting said collar 23 after the manner of the ordinary clutch lever and such construction falls within the spirit and scope of the present invention.

While the forms of the invention herein shown and described are what are believed to be preferable embodiments thereof, it is nevertheless to be understood that various forms and modifications thereof may be had without departing from the spirit and scope of the invention as claimed.

What I claim as new is:—

1. In combination with a traction wheel having longitudinally grooved spokes, of calk bars slidably mounted in the grooves of said spokes and having inner tapered ends lying adjacent to the wheel hub, normally retracted springs carried by the wheel and having their free ends arranged to engage notches in said bars, a tapered collar slidably mounted upon the wheel hub and adapted to engage the tapered ends of said bars to project the outer ends of the bars, said bars being laterally guided throughout their length, and having a positive endwise movement.

2. A device of the class described in combination with a wheel having its spokes provided with longitudinal dove-tail grooves, calk bars having dove-tail tongues slidably positioned within said grooves and having oblique inner ends, springs carried by the wheel rim and engaging notches in said bars and adapted for normally retracting the latter, a wedge collar axially slidable upon the outer end of the hub of said wheel engaging the oblique inner ends of said bars and seated in contact with the bases of the wheel spokes with the bars in the projected positions, and locking means for said collar comprising a washer and nut on the outer threaded end of the axle.

In testimony whereof I affix my signature in presence of two witnesses.

BOLESLAW JABLONSKI.

Witnesses:
WLADYSLAW ROSTOWSKI,
ANTHONY KORPUNTY.

Copies of this patent may be obtained for five cents each, by addressing the "Commissioner of Patents, Washington, D. C."